(12) United States Patent
Fujita (10) Patent No.: US 6,178,142 B1
(45) Date of Patent: Jan. 23, 2001

(54) MAGNETO-OPTICAL DISK DRIVE UTILIZING LEAKAGE MAGNETIC FIELD FROM PERMANENT MAGNETS AS EXTERNAL MAGNETIC FIELD

(75) Inventor: Masayuki Fujita, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/066,856

(22) Filed: Apr. 28, 1998

(30) Foreign Application Priority Data

Apr. 28, 1997 (JP) .................................................... 9-111348

(51) Int. Cl.[7] ...................................................... G11B 11/00
(52) U.S. Cl. ................................................................ 369/13
(58) Field of Search ........................... 369/13, 14, 110, 369/116, 114; 300/59

(56) References Cited

U.S. PATENT DOCUMENTS

| | | | |
|---|---|---|---|
| 4,672,594 | * | 6/1987 | Kato et al. .............................. 369/13 |
| 4,939,711 | * | 7/1990 | Yoda ....................................... 369/13 |
| 4,959,820 | * | 9/1990 | Horimai et al. ........................ 369/13 |
| 5,093,816 | * | 3/1992 | Taniguichi et al. .................... 369/13 |
| 5,126,983 | * | 6/1992 | Ikegame et al. ....................... 369/13 |
| 5,502,693 | * | 3/1996 | Okamoto et al. ...................... 369/13 |
| 5,563,853 | * | 10/1996 | Ishii ....................................... 369/13 |
| 5,617,379 | * | 4/1997 | Shinozaki et al. ..................... 369/13 |
| 5,748,579 | * | 5/1998 | Miyagi et al. ..................... 369/44.14 |
| 6,018,505 | * | 1/2000 | Miyatake et al. ...................... 369/13 |
| 6,021,100 | * | 2/2000 | Fujita .................................... 369/13 |

FOREIGN PATENT DOCUMENTS 3-152702    6/1991   (JP) .

* cited by examiner

*Primary Examiner*—Tan Dinh
(74) *Attorney, Agent, or Firm*—McGinn & Gibb, PLLC (57) ABSTRACT

An optical disk drive for writing, erasing and reading data on a recording surface of an optical disk medium, includes an objective lens which irradiates the recording surface with rays, a magnetic circuit which generates an electromagnetic force for positioning the objective lens freely at a desired location, and a lens actuator including a support device for supporting the objective lens. The magnetic circuit includes two permanent magnets which are disposed so as to oppose poles having the same polarity to each other with the objective lens interposed therebetween. The magnetic circuit forms, in a direction perpendicular to a surface of the objective lens, a leakage magnetic field having an intensity which covers a range of external bias magnetic field intensities required for recording and erasing data on the recording surface of the optical disk medium.

15 Claims, 6 Drawing Sheets

WRITING/READING MODE

FIG.4B

ERASING MODE

FIG.5A

WRITING/READING MODE

FIG.5B

ERASING MODE

FIG.6

DISTRIBUTION OF LEAKAGE MAGNETIC FIELD INTENSITIES ON RECORDING SURFACE OF OPTICAL DISK

FIG.7
PRIOR ART

MAGNETO-OPTICAL DISK DRIVE UTILIZING LEAKAGE MAGNETIC FIELD FROM PERMANENT MAGNETS AS EXTERNAL MAGNETIC FIELD

BACKGROUND OF THE INVENTION

1. Field of the Invention

The present invention relates to an optical disk drive, and more particularly an optical disk drive which is capable of writing, reading and erasing data.

2. Description of the Related Art

An optical disk drive records and erases data by focusing a laser beam onto a recording surface of an optical disk medium with an objective lens, heating a magnetic thin film on the recording surface to Curie point or a higher temperature and magnetizing a minute area irradiated with the laser beam by an external bias magnetic field in directions which are reverse between in a writing mode and an erasing mode. Therefore, it is requisite for the optical disk drive to form external bias magnetic fields, which must be magnetized in directions reverse to each other between the writing mode and the erasing mode.

Figure 7:
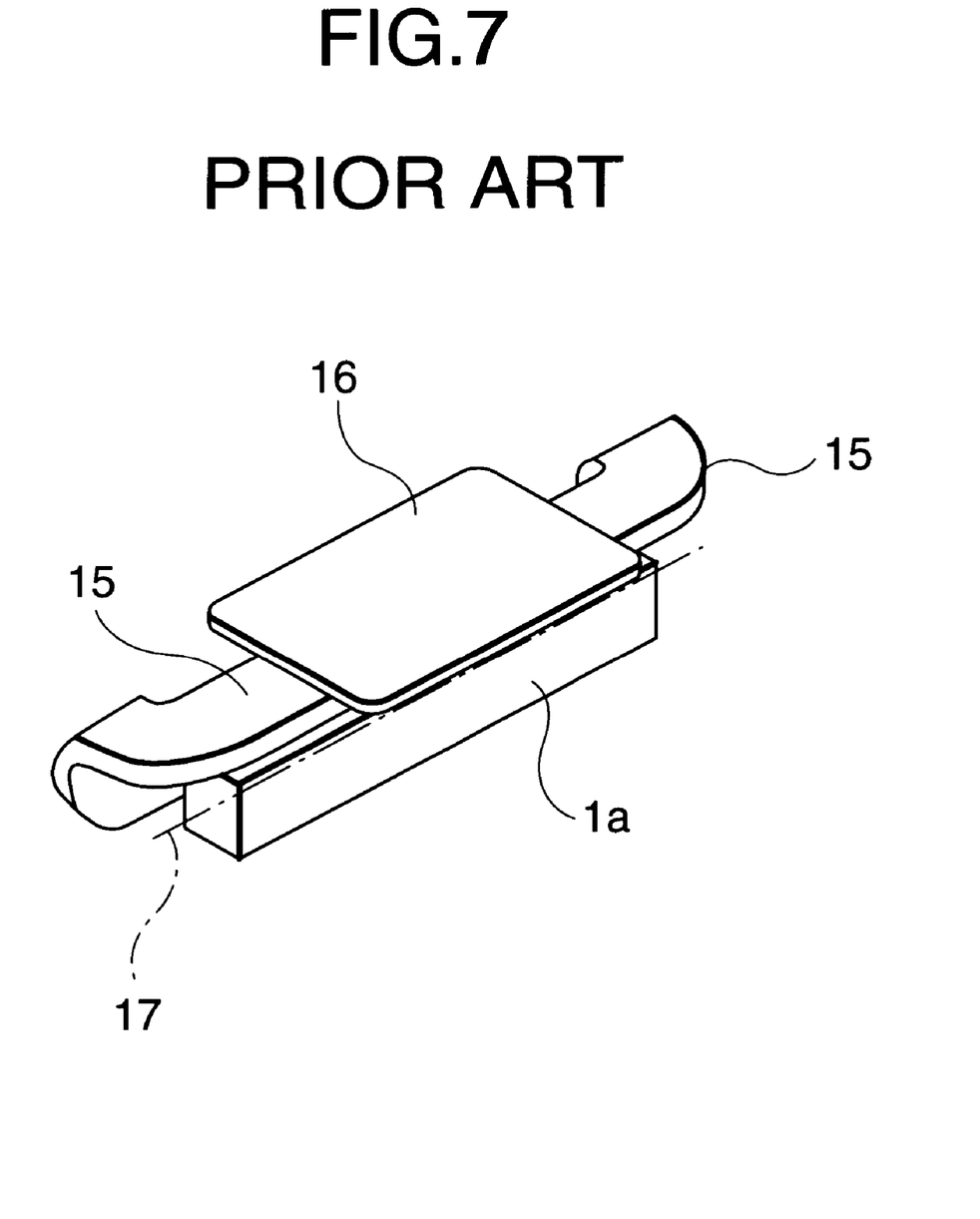
FIG. 7 is a block diagram illustrating bias magnetic field producing means according to the prior art.

To produce a bias magnetic field in a conventional optical disk drive, Japanese Patent Application Laid-Open No. 3-152702 discloses a configuration wherein a permanent magnet 1$a$ is opposed to an optical head with an optical disk medium interposed therebetween as shown in FIG. 7. A coil 15 is disposed around the permanent magnet 1$a$ as shown in FIG. 7 and a bias magnetic field required for writing or erasing is produced by rotating the permanent magnet 1$a$ with a repulsive force or an attractive force acting between a magnetic field produced by supplying a current to the coil 15 and a magnetic flux from the permanent magnet 1$a$.

The configuration which rotates the permanent magnet as described above, however, poses a problem that it requires a large number of parts such as those of a magnet rotating mechanism and a space for rotating the permanent magnet, thereby enlarging an upper portion of the optical disk medium. Further, the configuration requires a long time for mechanically reversing the permanent magnet, or switching from the writing mode to the erasing mode and vice versa, thereby constituting a hindrance to high speed processing.

In order to solve these problems, there has been proposed a technique which produces bias magnetic fields only with a coil, instead of a permanent magnet. This technique utilizes magnetic fields which are produced by supplying a current to the coil as the bias magnetic fields. This technique allows magnetic fields to be produced in directions reverse to each other by changing a direction of the current dependently on operating modes. This technique makes it possible to configure an optical disk drive more compact since it requires no space for rotating a coil and parts in a number smaller than that of the parts required for the configuration which rotates the permanent magnet. However, this technique poses a problem that it requires a circuit which reverses a direction of an electric current as a circuit for driving a bias coil and another problem that a constant current must be supplied as in each of the writing mode and the erasing mode, thereby resulting in enhancement of power consumption and temperature rise in an optical disk drive.

A first problem is that the conventional technique inevitably requires reversing a direction of a produced magnetic field as described above whether it uses a permanent magnet or a coil as magnetic field producer. Therefore, it requires a mechanism which rotates a magnet when a magnet is used or a circuit which reverses an applied current in a driving circuit when a coil is used for a reason described below:

In an optical disk drive in which data is written as a direction of magnetization on a surface of an optical disk medium, data is written, erased and read by detecting a digital signal of 0 or 1 dependently on a variation of Kerr rotating angle resulting from the direction of magnetization. Therefore, it is requisite to apply external bias magnetic fields to the minute area onto which the laser beam is focused in directions which are reverse to each other dependently on the data writing and erasing modes.

A second problem is that the conventional technique requires continuously supplying a current to the coil in both the writing and erasing modes when a coil is used for producing the bias magnetic fields in particular, thereby resulting in the enhancement of power consumption and the temperature rise in the optical disk drive. The temperature rise in the optical disk drive hinders it from operating stably and degrading its characteristics for a reason described below:

Since it is requisite to produce the bias magnetic fields for the optical disk drive as described above, the bias magnetic fields must be produced by applying the constant current in both the writing and erasing modes when a coil is used as bias magnetic field producing means. Accordingly, the current is always consumed to produce the bias magnetic fields in the writing and erasing modes, thereby raising temperature in the optical disk drive.

SUMMARY OF THE INVENTION

A primary object of the present invention is to correct the defects of the conventional techniques, or solve the problems of the space for rotating a magnet, increase in a number of parts, and long time required for rotation which constitutes the hindrance to high speed processing. Another object of the present invention is to eliminate the necessity to dispose a circuit for reversing a direction of a magnetic field produced in a driving circuit of a bias magnetic field producer, thereby reducing a number of parts so as to permit lowering a manufacturing cost and configuring a circuit board more compact.

Still another object of the present invention is to provide an optical disk drive which eliminates the necessity to operate the bias magnetic field producer in either of the writing mode or the erasing mode, thereby being capable of lowering power consumption and preventing temperature rise in the optical disk drive.

The optical disk drive according to the present invention is an optical disk drive for writing, erasing and reading data on a recording surface of an optical disk medium comprising:

an objective lens for irradiating the recording surface with rays;

a magnetic circuit which generates an electromagnetic force used for positioning the objecting lens freely at a desired position; and a lens actuator having support means which supports the objective lens, wherein the magnetic circuit is composed of two permanent magnets which are disposed in opposition to each other with the objective lens interposed therebetween, and wherein the optical disk drive is capable of producing, in a direction perpendicular to a surface of the objective lens, a leakage magnetic field having an intensity which covers a range of external bias magnetic field intensities required for writing and erasing data on the recording surface of the optical disk medium.

The optical disk drive according to the present invention further comprises:

a bias magnetic field producing means capable of forming, on the recording surface of the optical disk medium, a bias magnetic field which is directed in a direction reverse to that of a magnetic field leaking from the magnetic circuit and has an intensity, on the recording surface of the recording surface of the optical disk medium, which covers the range of the external bias magnetic field intensities required for writing and erasing data on the recording surface of the optical disk medium.

In the optical disk drive according to the present invention, a leakage magnetic field having an intensity corresponding to a magnetic field intensity required for data writing is acting from the magnetic circuit for driving objective lens which is disposed in the lens actuator to the recording surface of the optical disk medium. Therefore, the optical disk drive allows data to be written simply by enhancing a power of a laser beam in a writing mode. In an erasing mode, on the other hand, a magnetic field for data erasing can be produced for allowing data to be erased by driving a bias coil which is disposed in opposition to the lens actuator with an optical disk interposed therebetween. Accordingly, the optical disk drive does not require operating the bias coil in the writing mode and the bias coil is operated in the erasing mode only. Therefore, the optical disk drive makes it unnecessary to use, in a circuit for driving the bias coil, a circuit which reverses a direction of an applied current, thereby resulting in reduction of a number of parts and lowering of a manufacturing cost. Furthermore, the optical disk drive is capable of halving power consumption by the bias coil and preventing temperature rise in the optical disk drive since it does not require operating the bias coil in the writing mode.

Moreover, a magnetic thin film on the recording surface of the optical disk is not heated to Curie point in a reading mode wherein the laser beam has a power which is sufficiently weaker than that in the writing or erasing mode. Accordingly, a direction of a magnetic domain on the recording surface is not reversed in the reading mode by the leakage magnetic field from the magnetic circuit in the lens actuator.

The functions described above remain unchanged even when the leakage magnetic field from the magnetic circuit for driving the objective lens in the lens actuator is used as the bias magnetic field required in the erasing mode and the magnetic field produced by the bias coil is used as the bias magnetic field required in the writing mode.

Figure 4A:
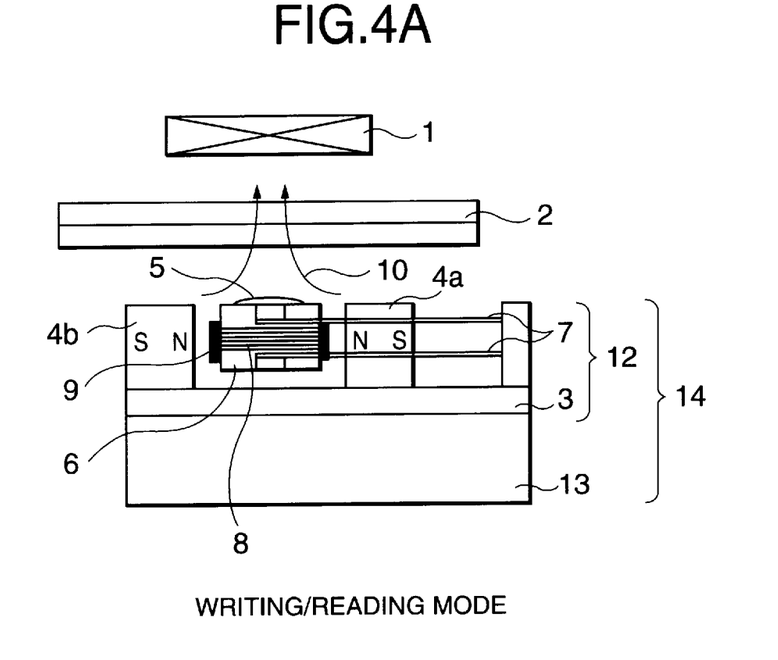
Figure 4B:
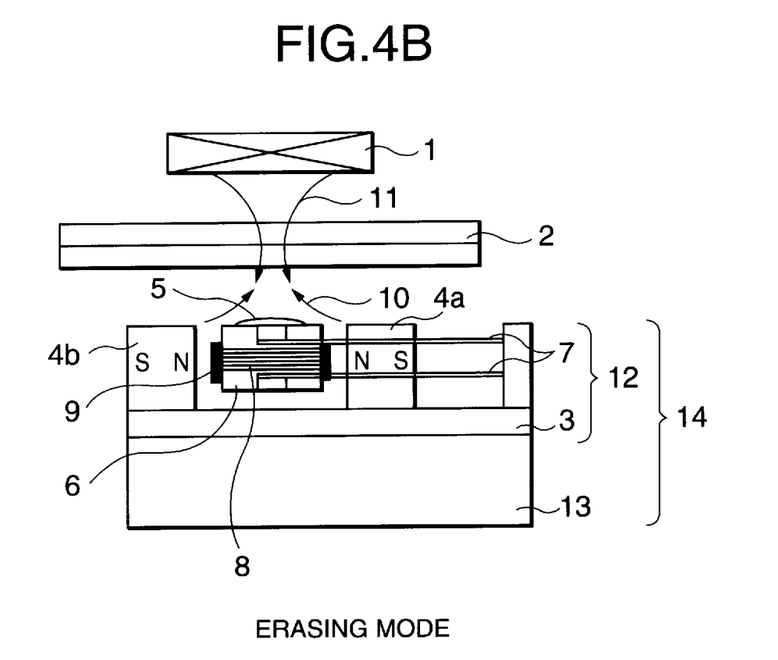

In addition, these functions remain the same, needless to say, even when magnetic fields are produced in directions reverse to those of the magnetic fields shown in FIG. 4.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIGS. 4A and 4B are side views illustrating operations of the embodiment the optical disk drive according to the present invention: FIG. 4A showing operations in a writing or reading mode and FIG. 4B showing operations in an erasing mode;

FIGS. 5A and 5B are side views illustrating operations of another embodiment of the optical disk drive according to the present invention: FIG. 5A showing operations in the writing or reading mode and FIG. 5B showing operations in the erasing mode;

DESCRIPTION OF THE PREFERRED EMBODIMENTS

Now, description will be made of the embodiments of the present invention with reference to the accompanying drawings.

Figure 1:
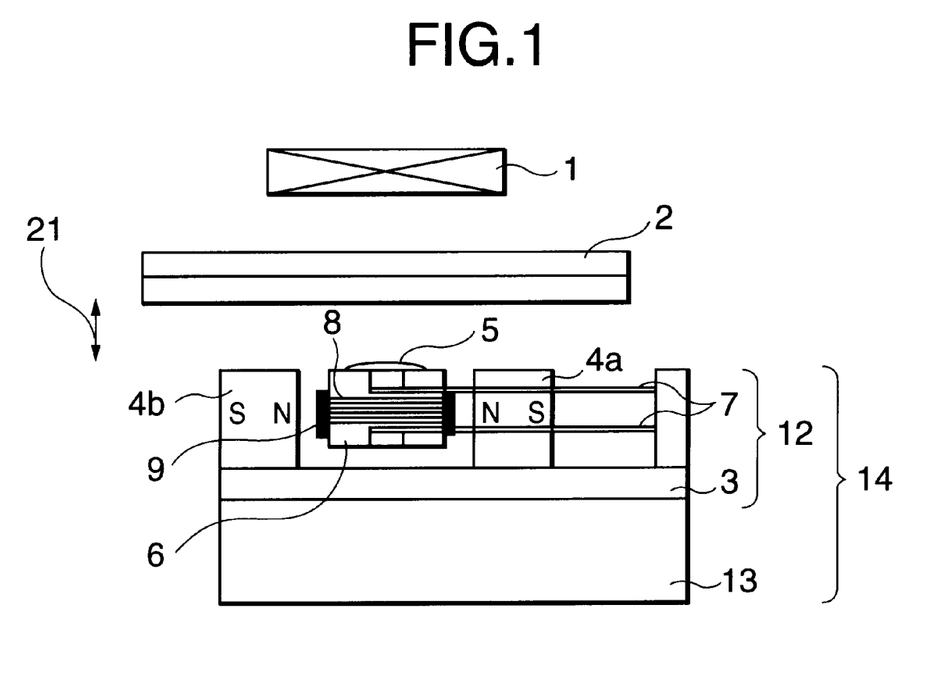
FIG. 1 is a side view illustrating an embodiment of the optical disk drive according to the present invention.
Figure 2:
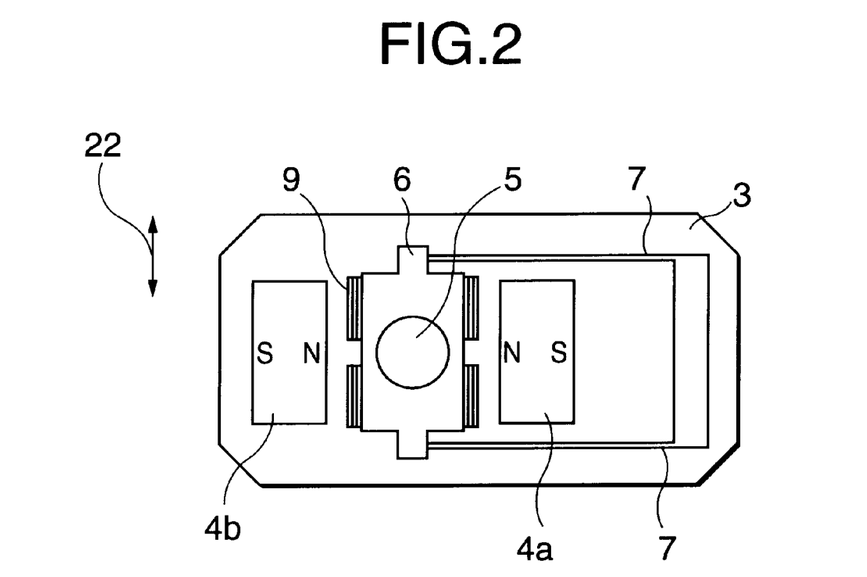
FIG. 2 is a top view illustrating the embodiment of the optical disk drive according to the present invention.
Figure 3:
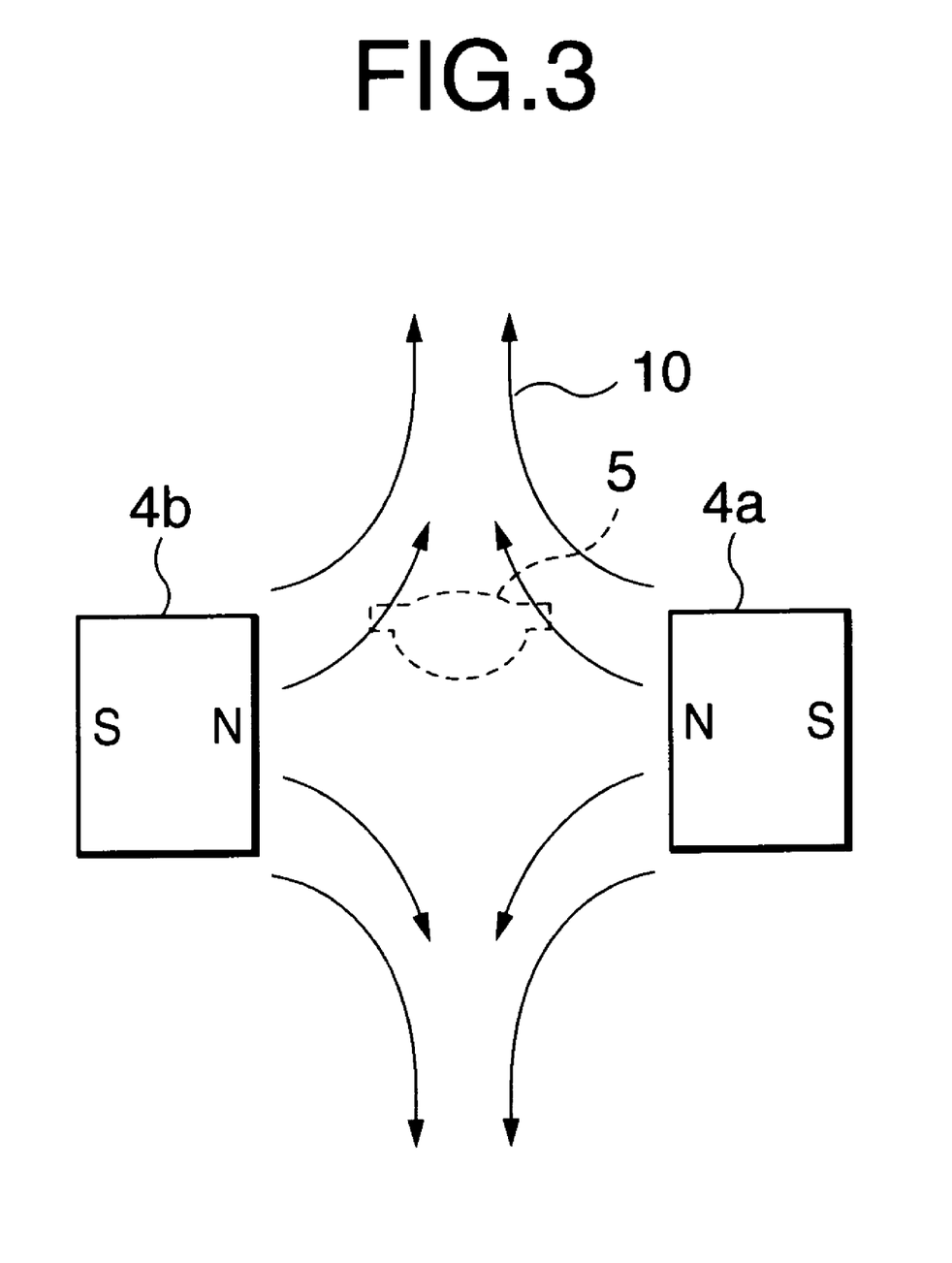
FIG. 3 is a configurational diagram illustrating a magnetic circuit for driving an objective lens in the optical disk drive according to the present invention.

Referring to FIGS. 1 through 3 illustrating a best embodiment of the present invention, a yoke is not provided for a magnetic circuit for driving an objective lens 5 which comprises permanent magnets 4a and 4b arranged in opposition to each other on both side of a lens holder 6 which is equipped with the objective lens 5, supported by four wires 7, and freely movable in a focusing (up-down) direction 21 and a tracking direction (circumferential direction of a disk) 22. Since a magnetic field produced by the permanent magnets 4a and 4b is distributed as shown in FIG. 3 in this case, a magnetic field leaks in a direction perpendicular to a surface of the objective lens 5. In the present invention, this leakage magnetic field is utilized as an external magnetic field required for writing and erasing data, and a material, a form, etc. of the magnets are selected so that the leakage magnetic field 10 has an intensity which covers a range of external magnetic field intensities required for writing and erasing data on a recording surface of an optical disk 2. In addition, a focusing coil 8 and a tracking coil 9 are wound around the lens holder 6 to drive the objective lens 5 in the focusing direction and the tracking direction, thereby driving the objective lens 5 to a desired position with a magnetic field which is formed between the magnets in a magnetizing direction thereof out of magnetic fields produced by the permanent magnets 4a and 4b as shown in FIG. 3, and electromagnetic forces produced by supplying currents to the coils.

The magnetic circuit which is not equipped with a yoke produces a weak magnetic flux, thereby making it necessary to increase a number of turns of the focusing coil 8, Since the magnetic circuit is not equipped with no yoke which is composed of iron blocks, however, it provides an effect to permit lessening a weight of the lens actuator 12, thereby shortening a seek time.

The optical disk drive according to the present invention has a movable unit 14 which is equipped with the lens actuator 12 comprising the members described above such as the permanent magnets 4a and 4b, the objective lens 5, and the wires 7, and an optical head 13 which emits a laser beam and detects various signals, as well as a bias coil 1 which is disposed in opposition to the movable unit 14 with the optical disk 2 interposed therebetween and capable of producing, in a direction reverse to the leakage magnetic field 10, a magnetic field 11 having an intensity covering a range of external bias magnetic field intensities required for writing and erasing data on the recording surface of the optical disk 2.

Now, operations of the embodiment of the present invention will be described in details with reference to FIG. 4.

When the optical disk drive according to the present invention is set as shown in FIG. 4A for writing data, it first raises a temperature of a minute area of the magnetic thin film on the optical disk 2 on which the laser beam is focused to Curie point by enhancing a power of the laser beam to an intensity required for writing. Since the leakage magnetic field 10 from the magnetic circuit for driving the objective lens 5 has been formed by this time as an external bias magnetic field which has an intensity required for writing data on the recording surface of the optical disk 2, a magnetic domain on a recording film heated to Curie point is set in a direction of the leakage magnetic field 20, thereby being ready for writing. At this stage, the bias coil 1 does not operate, thereby consuming no electric power and causing no temperature rise in the optical disk drive due to heat evolution by itself.

When the optical disk drive is set as shown in FIG. 4B for erasing data, the bias coil 1 forms the magnetic field 11 which is directed reverse to the leakage magnetic field 10 from the magnetic circuit for driving the objective lens 5 and has an intensity covering the range of an external magnetic field intensity required for erasing data on the recording surface of the optical disk 2. The optical disk drive then raises a temperature of the minute area of the magnetic thin film on the optical disk 2 on which the laser beam is focused to Curie point similarly to the writing stage by enhancing the power of the laser beam to an intensity required for erasing, thereby forming a magnetic domain on the magnetic thin film in a direction reverse to that for writing by the magnetic field 11 which is formed with the bias coil 1 and erasing the data.

When the optical disk drive is set as shown in FIG. 4A for reading data, it does not operate the bias coil 1 as in the writing mode. Accordingly, a power of the laser beam for reading data is not so strong as to raise a temperature of the magnetic thin film on the optical disk to Curie point unlike the power for writing or erasing data though the leakage magnetic field 10 for driving the objective lens 5 covers the recording surface of the optical disk 2 at a stage to read recorded signals. Therefore, recording signals are not written over the recorded signals even though the external magnetic field covers the recording surface.

The similar effect can be obtained even when the leakage magnetic field 10 from the magnetic circuit for driving the objective lens 5 is used as an external bias magnetic field which is required for erasing and the magnetic field 11 formed by the bias coil 1 is used as an external bias magnetic field which is required for writing by the operations described above. Needless to say, the leakage magnetic field 10 and the magnetic field 11 formed by the bias coil 1 may be set in directions which are reverse to those shown in FIGS. 4A and 4B respectively.

Then, more detailed description will be made of the embodiment of the present invention with reference to the accompanying drawings.

Figure 6:
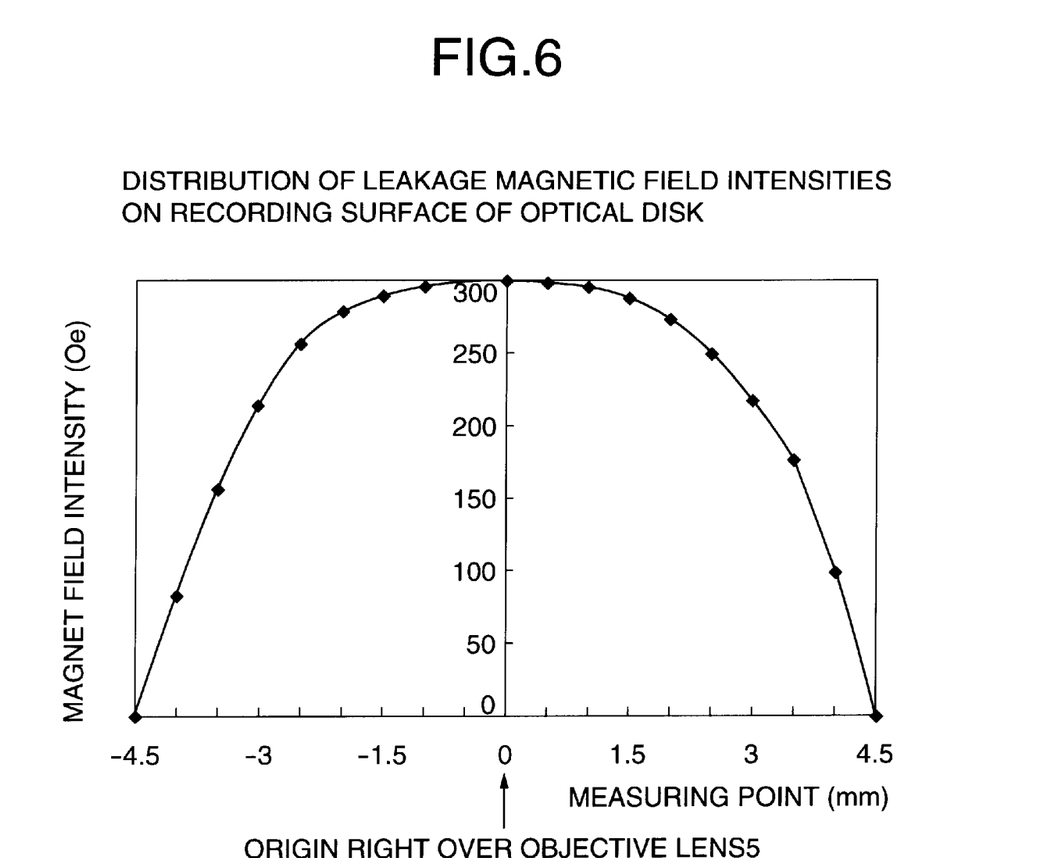
FIG. 6 is a graph illustrating an intensity distribution of a leakage magnetic field on a recording surface of an optical disk in the optical disk drive according to the present invention.

Referring to FIGS. 1 through 4 illustrating the first embodiment of the present invention, the magnetic circuit for driving the objective lens 5 is not equipped with a yoke though it comprises the permanent magnets 4a and 4b disposed in opposition to each other on both the sides of the lens holder 6 which is equipped with the objective lens 5 and is supported by the four wires 7, and is freely movable in the focusing direction (up-down direction) and the tracking direction (circumferential direction of the disk). When rare earth magnets each measuring 5 mm high by 5 mm wide by 2.4 mm thick are used as the permanent magnets 4a and 4b, and the recording surface of the optical disk 2 is set 3.6 mm as measured from top surfaces of the magnets, a magnetic field which is formed on the recording surface of the optical disk 2 has an intensity of approximately 300 oersteds in a vertical direction as seen from experiment data shown in FIG. 6. Accordingly, these permanent magnets covers a range of external magnetic field intensities, or 100 to 500 oersteds, which are generally required for writing and erasing data on optical disks. In addition, the focusing coil 8 and the tracking coil 9 are wound around the lens holder 6 for driving the objective lens 5 in the focusing direction and the tracking direction so that the objective lens 5 is driven or moved to a desired position by the magnetic field which is formed between the magnets in the magnetizing directions thereof out of the magnetic fields produced by the permanent magnets 4a and 4b as shown in FIG. 3 as well as electromagnetic forces generated by supplying currents to the coils.

The embodiment of the optical disk drive according to the present invention has the movable unit 14 which is composed of the lens actuator 12 comprising the members described above such as the permanent magnets 4a and 4b, the objective lens 5 and the wires 7, and the optical head 13 for emitting the laser beam and detecting various signals, as well as the bias coil 1 which is disposed in opposition to the movable unit 14 and forms the magnetic field 11 in the direction reverse to the leakage magnetic field 10 and having an intensity covering the range of external magnetic field intensities, or 100 to 500 oersteds, required for writing and erasing data on the recording surface of the optical disk 2.

Then, operations of the embodiment of the present invention will be described in more details with reference to FIG. 4.

Referring to FIG. 4 illustrating the optical disk drive according to the present invention, the magnetic circuit is not equipped with a yoke though it comprises the permanent magnets 4a and 4b which are disposed in opposition to each other on both the sides of the lens holder 6 and made of a rare earth. The permanent magnets which have the dimensions and are made of the material described in the embodiment produce the leakage magnetic field 10 having an intensity of approximately 300 oersteds on the recording surface of the optical disk 2 in a direction perpendicular to the objective lens 5 as seen from the graph shown in FIG. 6.

When the optical disk drive is set as shown in FIG. 4A to write data on the optical disk 2, a temperature of the minute area of the magnetic thin film is raised to Curie point by enhancing the power of the laser beam to an intensity of approximately 10 mW which is required for writing. Though a coercive force of the minute area of the magnetic thin film is zeroed at this time, it is magnetized in a direction of the leakage magnetic field by the leakage magnetic field 10. Signals are written by changing a direction of a magnetic domain as desired. Since the bias coil 1 does not operate at this time, it does not consume electric power and causes no temperature rise in the optical disk drive due to heat evolution by itself.

To erase data, the optical disk drive operates, as shown in FIG. 4B, the bias coil 1 which is disposed in opposition to the optical disk with the optical disk 2 interposed therebetween and applies to the bias coil 1 a current at such a level as to produce a magnetic flux which is directed reverse to the leakage magnetic field 10 from the magnetic circuit for driving the objective lens and has an intensity on the order of approximately 300 oersteds on the recording surface of the optical disk 2. Accordingly, a bias magnetic field for erasing data is formed on the recording surface of the optical disk 2. When a power of the laser beam is enhanced to a level which is required for erasing, a temperature of the minute area of magnetic thin film on the optical disk medium 2 is raised to Curie point as in the writing mode and the magnetic field 11 produced by the bias coil 1 sets a magnetic domain in a direction reverse to that for writing by the magnetic field, whereby the optical disk drive is ready for erasing data.

The bias coil is not operated to read data. Though the recording surface of the optical disk 2 is covered with the leakage magnetic field 10 from the magnetic circuit for driving the objective lens which has an intensity of approximately 300 oersteds in the mode to read recorded signals, a temperature of the magnetic thin film on the optical disk medium is not raised to Curie point unlike the temperature in the writing mode or the erasing stage since a laser power of approximately 1 mW is sufficient for reading data. Therefore, recording signals are not written over the recorded signals though the recording surface of the optical disk 2 is covered with the external magnetic field.

A similar effect can be obtained even when the leakage magnetic field 10 from the magnetic circuit for driving the objective lens is used as a bias magnetic field which is required for erasing and the magnetic field 11 produced by the bias coil is used as a bias magnetic field which is required for writing in the operations described above. In addition, the functions remain unchanged, needless to say, when magnetic fields are produced in the directions reverse to those of the leakage magnetic field 10 and the magnetic field 11 produced by the bias coil 1 which are shown in FIGS. 4A and 4B.

Figure 5A:
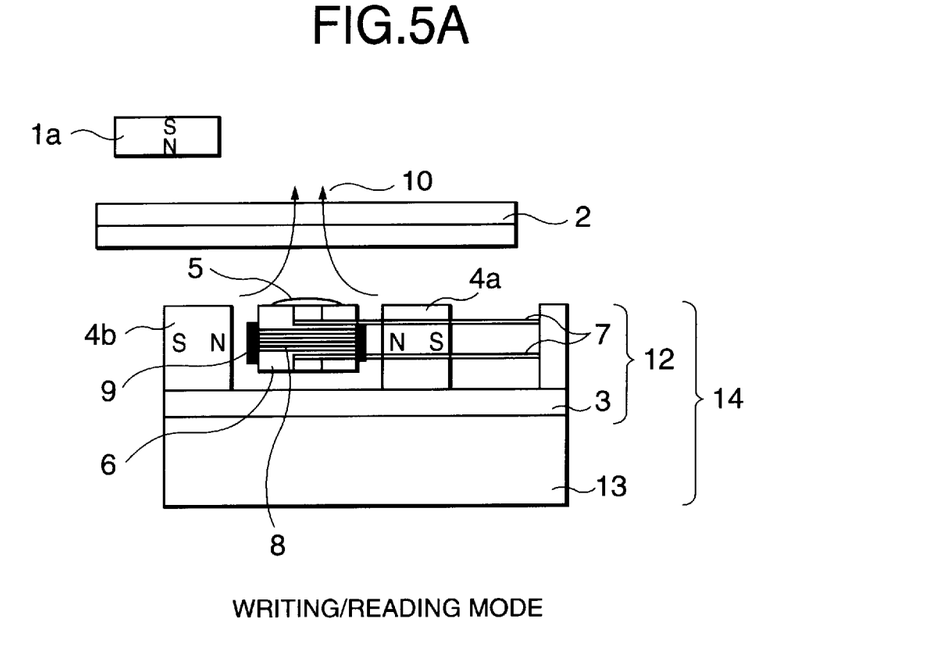
Figure 5B:
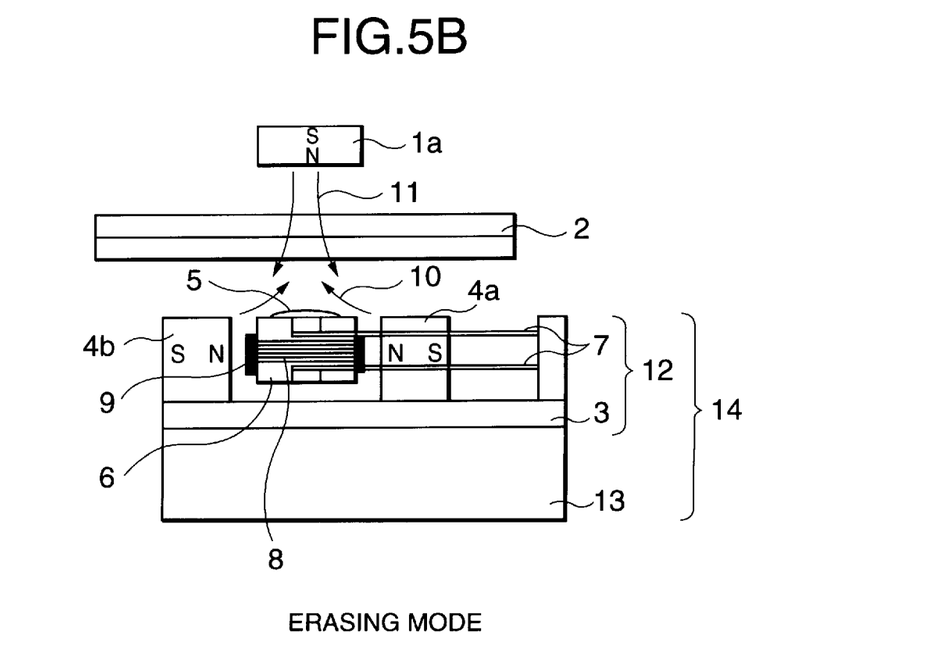

Now, a second embodiment of the present invention will be described with reference to the accompanying drawings. In the optical disk drive according to the present invention, an external bias magnetic field which is required for one (writing or erasing) mode is allowed to leak from a magnetic circuit for driving an objective lens and an external bias magnetic field which is required for another (erasing or writing) mode is formed by a bias coil. A similar effect can be obtained using a permanent magnet in place of the bias coil. Speaking concretely, in an optical disk drive configured to comprise a permanent magnet 1a which is disposed in opposition to a lens actuator 12 with an optical disk 2 interposed therebetween and movable in a direction in parallel with a surface of the optical disk, a leakage magnetic field 10 from permanent magnets 4a and 4b composing a magnetic circuit for driving an objective lens is used as an external bias magnetic field required for writing data and the permanent magnet 1a is set aside from a direction perpendicular to surfaces of an objective lens 5 during writing as shown in FIG. 5A. For erasing data, on the other hand, the permanent magnet 1a is moved in parallel until it is located over the objective lens 5 as shown in FIG. 5B to form a bias magnetic field 11 as an external bias magnetic field required for erasing.

For the operations described above, a similar effect can be obtained when the leakage magnetic field 10 from the magnetic circuit for driving objective lens is used as the bias magnetic field required for erasing and the magnetic field 11 formed by the permanent magnet 1a is used as the bias magnetic field required for writing. Needless to say, the functions remain the same when an optical disk drive is configured to form magnetic fields in directions reverse to those of the leakage magnetic field 10 and the bias magnetic field 11 shown in FIGS. 5A and 5B.

In a third embodiment wherein an objective lens is supported with a leaf spring or a slider, it is possible to obtain a similar effect by composing a magnetic circuit for driving an objective lens of permanent magnets which are disposed so as to oppose their N or S poles to each other.

The optical disk drive according to the present invention provides a first effect that it suffices to produce an external bias magnetic field required for data writing or erasing only in a writing or erasing mode by operating the bias coil which is disposed in opposition to the optical head with the optical disk interposed therebetween. Accordingly, the optical disk drive according to the present invention makes it unnecessary to use a circuit for reversing a direction of a bias magnetic field in a driving circuit which operates the bias coil. As a result, the optical disk drive according to the present invention permits reducing numbers of parts and circuits, thereby making it possible to lower a manufacturing cost and configure an optical disk drive more compact.

The first effect is obtained owing to a fact that the optical disk drive according to the present invention does not require operating the bias coil which is disposed in opposition to the optical head with the optical disk interposed therebetween since the magnetic circuit for driving objective lens is designed so that a magnetic field leaking from this circuit has an intensity which covers a range of bias magnetic field intensity required for writing or erasing data on a recording surface of the optical disk.

The optical disk drive according to the present invention provides a second effect that it operates the bias coil only for data writing or erasing and consumes electric power in an amount about half that consumed by the conventional optical disk drive which uses a bias coil in both writing and erasing modes, thereby being capable of preventing temperature rise from being caused in the optical disk drive.

The second effect is obtained owing to a fact that the optical disk drive according to the present invention does not operate the bias coil in the writing or erasing mode since it uses the magnetic field leaking from the magnetic circuit for driving the objective lens as the bias magnetic field required for recording or erasing data on the optical disk.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An optical disk drive for writing, erasing and reading data on a recording surface of an optical disk medium, comprising:

an objective lens which irradiates said recording surface with rays;

a magnetic circuit which generates an electromagnetic force for positioning said objective lens freely at a desired location; and a lens actuator including support means for supporting said objective lens, wherein said magnetic circuit includes two permanent magnets which are disposed so as to oppose poles having the same polarity to each other with said objective lens interposed therebetween, and wherein said magnetic circuit forms, in a direction perpendicular to a surface of said objective lens, a leakage magnetic field having an intensity which covers a range of external bias magnetic field intensities required for recording and erasing data on said recording surface of said optical disk medium.

2. An optical disk drive according to claim 1, wherein said optical disk drive further comprises means for forming, on the recording surface of said optical disk medium, a bias magnetic field which has a direction reverse to that of the magnetic field leaking from said magnetic circuit and has an intensity covering said range of the external bias magnetic field intensities required for writing and erasing data on said recording surface of said optical disk medium.

3. An optical disk drive according to claim 1, wherein said range of the external bias magnetic field intensities is 100 to 500 oersteds.

4. An optical disk drive according to claim 2, wherein said means for forming a bias magnetic field comprises a coil which is disposed in opposition to said lens actuator with said optical medium interposed therebetween.

5. An optical disk drive according to claim 2, wherein said bias magnetic field forming means comprises a permanent magnet.

6. An optical disk drive according to claim 5, wherein said permanent magnet is disposed in opposition to said lens actuator with said optical disk medium interposed therebetween, movable along or in parallel with said optical disk medium and is selectively set aside from a direction perpendicular to said objective lens.

7. An optical disk drive according to claim 1, wherein said support means comprises wires.

8. An optical disk drive according to claim 1, wherein said support means comprises a leaf spring.

9. An optical disk drive according to claim 2, wherein said range of the external bias magnetic field intensities is 100 to 500 oersteds.

10. An optical disk drive according to claim 2, wherein said support means comprises wires.

11. An optical disk drive according to claim 2, wherein said support means comprises a leaf spring.

12. An optical disk drive comprising:

a lens which irradiates a recording surface of a medium with rays;

a circuit which generates a force for positioning said lens freely at a desired location; and a lens actuator including a support device for supporting said lens, wherein said circuit includes two permanent magnets which are disposed so as to oppose poles having the same polarity to each other with said lens interposed therebetween, and wherein said circuit forms, in a direction perpendicular to a surface of said lens, a leakage magnetic field having an intensity which covers a range of external bias magnetic field intensities required for recording and erasing data on said recording surface of said medium.

13. The optical disk drive according to claim 12, further comprising a device for forming a bias magnetic field which is disposed in opposition to said lens actuator with said optical disk medium interposed therebetween.

14. The optical disk drive according to claim 12, wherein said lens comprises an objective lens.

15. An optical disk drive comprising:

a lens which irradiates a recording surface of a medium with rays;

a circuit which generates a force for positioning said lens freely at a desired location; and a lens actuator including a support device for supporting said lens, wherein said circuit includes first and second magnets which are disposed so as to oppose poles having the same polarity to each other with said lens interposed therebetween, and wherein said circuit forms a leakage magnetic field having an intensity which covers a range of external bias magnetic field intensities required for recording and erasing data on said recording surface of said medium.

* * * * *